Dec. 19, 1961   G. SCHÜTZE   3,013,504
SWITCHES FOR MONOBEAM TYPE RAILWAYS
Filed Jan. 26, 1959   3 Sheets-Sheet 1
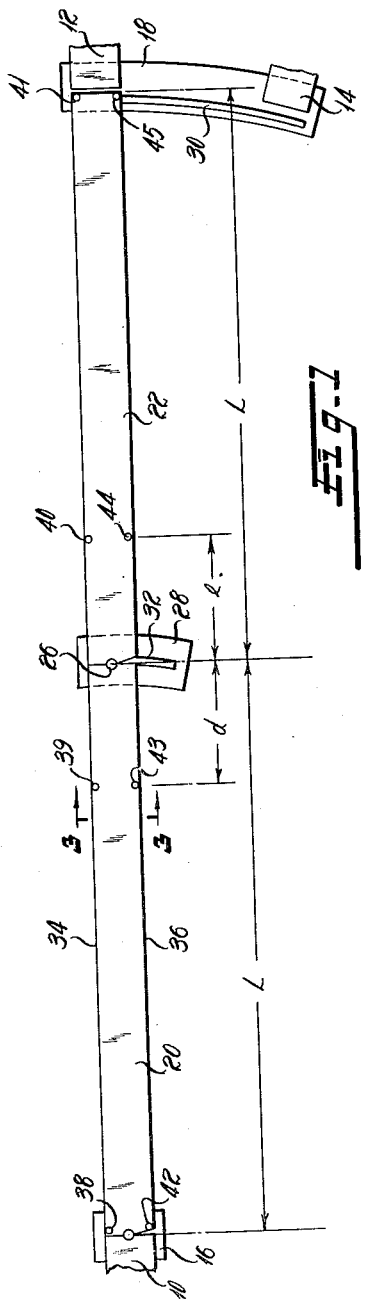
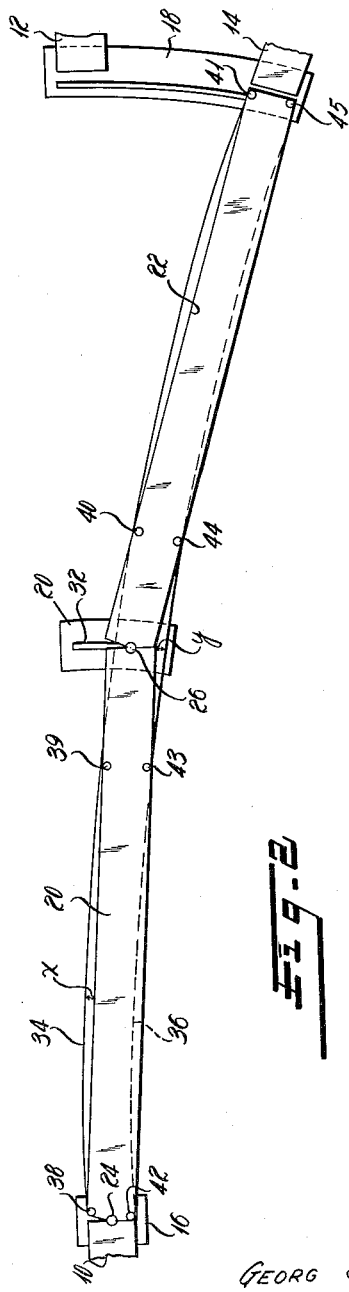
INVENTOR
GEORG SCHÜTZE
BY
ATTORNEYS

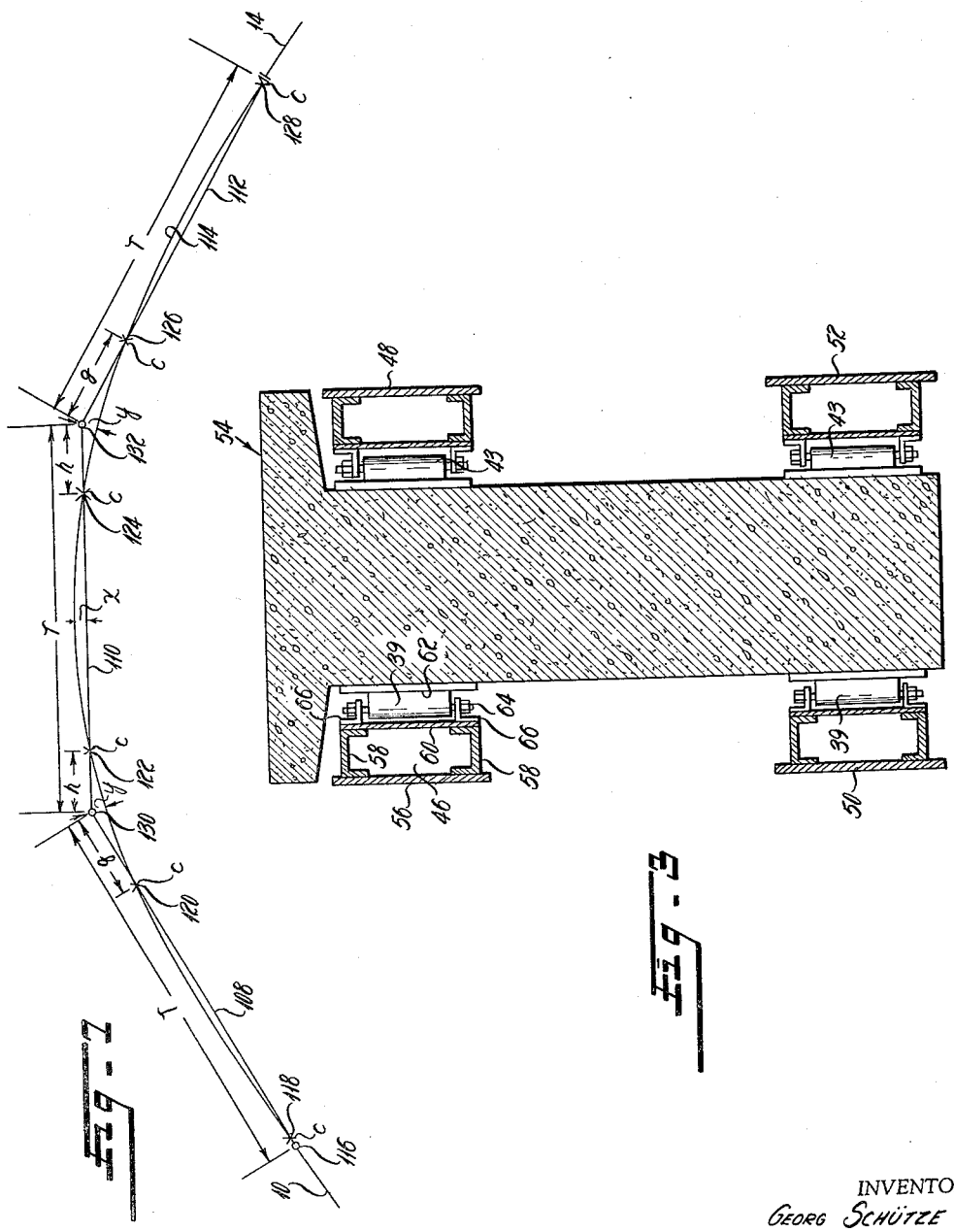

Dec. 19, 1961   G. SCHÜTZE   3,013,504
SWITCHES FOR MONOBEAM TYPE RAILWAYS
Filed Jan. 26, 1959   3 Sheets-Sheet 3
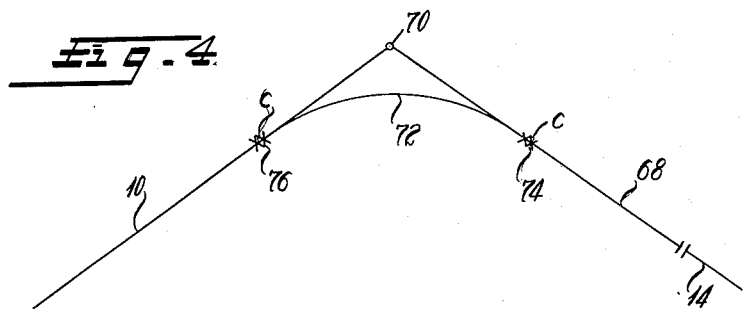
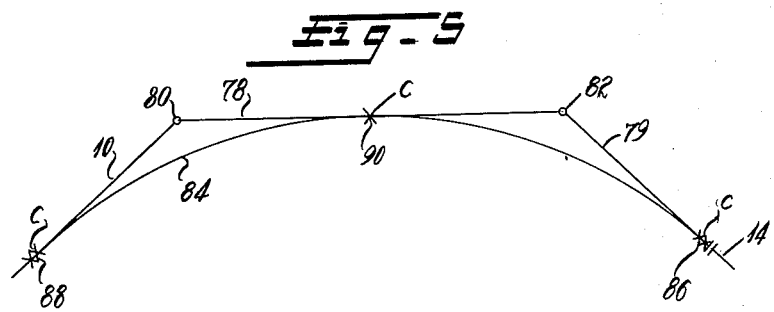
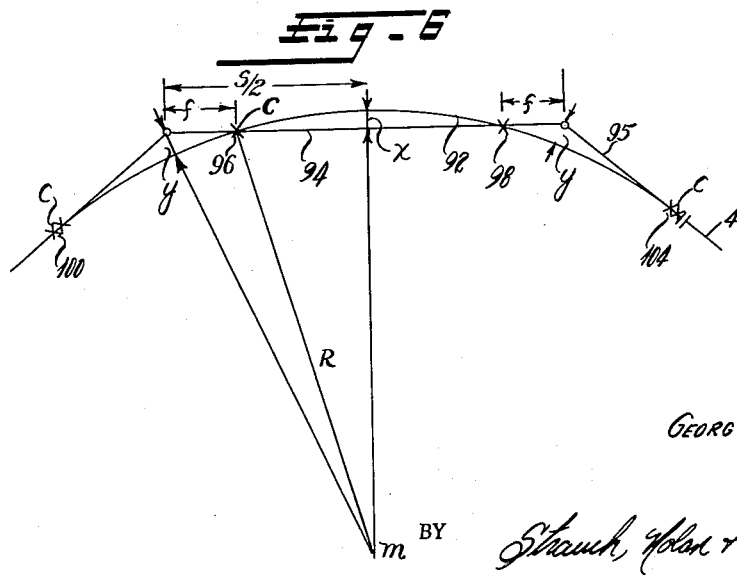
INVENTOR
GEORG SCHÜTZE
BY
ATTORNEYS United States Patent Office 3,013,504
Patented Dec. 19, 1961

3,013,504
SWITCHES FOR MONOBEAM TYPE RAILWAYS
Georg Schütze, Koln-Bickendorf, Germany, assignor to Alweg-Forschung G.m.b.H., Koln, Germany, a corporation of Germany
Filed Jan. 26, 1959, Ser. No. 789,149
Claims priority, application Germany Feb. 1, 1958
10 Claims. (Cl. 104—130)

The present invention relates to switch constructions and more particularly to switch constructions for railway systems of the monobeam type. In such systems the track comprises a relatively heavy usually substantially rectangular beam member having top and side running surfaces, the former supporting the load carrying vehicle wheels and the latter engaging upper and lower lateral vehicle wheels which guide the vehicle and transfer tilting forces to the beam. Preferably the track beam is made of a reinforced concrete structure.

In the past switches for this type of railway have been suggested in which the switch tongue consists of one or more rigid beam sections which are pivotally connected to the main line and to each other respectively. In "branching off" position, i.e. when the switch connects two angularly related monobeam track sections, the individual switch beam sections are angularly related to each other. In branching off position small angles are produced at the sides of such a switch construction which result in considerable lateral shocks on the vehicle passing the switch at high speed, so that those switches can be utilized only for low speed operation.

In U.S. Patent 2,903,972 a monobeam type switch has been suggested which also consists of pivotally connected beam sections, but in which at least one of the side elements forming the lateral running surfaces is constructed as a structural member independent of the beam sections and being adjustable in such a way as to form a continuously curved running surface for the side wheels of the vehicle. This switch permits passage over it at high speed without causing lateral shocks on the vehicle. The independently adjustable members consist among other things of elastically deformable metal strips which by means of mechanically, electrically, hydraulically or pneumatically acting adjusting devices are positioned into the corresponding shape. However, such adjusting devices for the lateral members increase the costs of such a switch substantially and require special maintenance in order to avoid operational troubles.

It is the primary purpose and object of the present invention to provide novel switch constructions for monobeam type railways in which the above mentioned disadvantages are avoided. In attaining this primary object and other objects, the invention contemplates the provision of a novel switch construction which consists of pivotally connected beam sections, the end of one section being pivotally connected to the main line and in which for eliminating the angles between the beam sections in branching off position, flexible strip members are provided which are supported at one or at the most at two determined points of each switch beam section and if occasion arises also at the main line, each flexible strip member being supported at one point by a fixed support and the remaining supporting members being constructed to allow longitudinal shifting of the strips at the supports, whereby during positioning of the switch the flexible strip members are directly adjusted as straight or continuously curved tracks respectively.

The present invention thus avoids the expensive adjusting devices without limiting the range of performance or application of the switch. The required shape of the lateral flexible strip members forming the side running surfaces is obtained solely by the lateral turning movement of the switch beam sections together with the supporting members for those strip members secured to them. The points of support of a strip member are arranged in such a way that in straight position of the switch they are located on a straight line and in branching off position they are located on a curved line corresponding to the required line of curve of the track, e.g., a circular arc.

Preferably the flexible strip members are made of steel sheets and/or sectional steel forming a box-shaped structure. In order to keep the radii of the flexible strip elements as great as possible preferably the flexible strip elements extend along the entire length of the switch tongue. The fixed supports are preferably arranged at the free end of the switch tongue. This avoids a longitudinal shifting of the strip elements at the free end of the switch when it is brought into branching off position, so that the switch tongue can be connected with the branch lines without obtaining too large a gap between the switch beam section and the branch line. The bridging between the shiftable end of a flexible strip element and the adjacent running track of the main line is performed by means of so-called finger plates as well known from bridge constructions, in which by comb-like members extending one into the other a transition of the track is obtained which is longitudinally shiftable and free of jerks.

In special cases the switch tongue may consist of only a single rigid beam section, but switches preferably consist of several pivotally connected switch beam sections being either of equal length or of differing length. A number of embodiments of the present invention may be obtained the selection of which is done according to operational or economical requirements.

Additional objects and advantages will become apparent as the description proceeds in connection with the accompanying drawings illustrating typical embodiments of the invention and in which:

FIGURE 1 is a diagrammatic top plan view of a switch disposed in a position to connect aligned through track sections;

FIGURE 2 is a diagrammatic top plan view of the switch of FIGURE 1 disposed in "branching off" position to connect angularly related through track sections;

FIGURE 3 is a section taken along line 3—3 of FIGURE 1; and

FIGURES 4 to 7 are diagrammatic top plan views of different embodiments of the switch showing the positions of the beam sections, of the lateral flexible strip members forming the side running surfaces and of the supporting points of the same, all switches being in branching off position.

Referring now more particularly to the drawings and especially to FIGURES 1 and 2, the track and switch construction comprises a main line monobeam 10 aligned with the monobeam 12 and a branch line 14. Preferably the beams are of substantially rectangular cross section with recessed sides and are made of reinforced concrete. The end of the main line 10 is supported on a supporting plate 16 and the ends of the lines 12 and 14 are supported on a common supporting plate 18. The actual switch tongue comprises two switch beam sections 20 and 22 of the same general construction as the main line beams. Section 20 is pivotally connected to the main line 10 as at 24 and the sections 20 and 22 are pivotally connected to each other as at 26. At this linking point the sections 20 and 22 are commonly supported by a supporting plate 28 whereas the other ends of the sections 20 and 22 are supported on the supports 16 and 18 respectively. The supports 18 and 28 are provided with guide rails 30 and 32 respectively on which the beam sections can be moved transversely by means of bogies and a drive mechanism not forming part of this invention and not shown. For example bogies may be utilized as disclosed in the aforesaid Patent 2,903,972. In an elevated monobeam construction, the supporting plates 16, 18 and 28 may be mounted on pylons. Also the pivotal connections 24 and 26 per se do not form part of this invention and may be of any suitable design.

Along both sides of the beam sections 20 and 22 and extending along both switch beam sections flexible strip members 34 and 36 are provided by means of which horizontal side wheels of vehicles passing the switch are guided without shocks and jerks over the switch. In the straight position of the switch as shown in FIGURE 1, the lateral contours of the strip members are identical with those of the beam sections 20 and 22. In FIGURE 2 however, which shows the switch in branching off position, the beam sections are angularly related whereas the flexible strip members 34 and 36 which are secured to the beam sections as at 38, 39, 40, 41 and 42, 43, 44, 45 respectively are bent in the required curvature of the track. The points 41 and 45 are fixed supports whereas at 38, 39, 40 and 42, 43, 44 the flexible strip members are supported in such a way as to allow limited longitudinal shifting of these members.

In branching off position as shown in FIGURE 2 the strip members 34 and 36 extend partly within and partly outwardly of the outer contours of the beam sections 20 and 22. The supporting points 38, 39, 40, 41 and 42, 43, 44, 45 are located in such a way that in branching off position the strip members have a shape of curvature which is composed of two parabolic arcs serving as transition curves (extending from 38 to 39, 42 to 43 and from 40 to 41, 44 to 45) and intermediate circular arcs (extending from 39 to 40 and from 43 to 44). Further the distance $d$ between the points 39, 43 and the adjacent end of the beam section 20 and the distance $e$ between the points 40, 44 and the adjacent end of the beam 22 are such that the maximal deviations $x$ and $y$ between the outer contours of the beam sections and those of the strip members are equal. As calculations and tests have shown, the distances $d$ and $e$ must have a value which is 0.12 to 0.16 times that of the length L of a beam section. Preferably the exact distances $d$ and $e$ are ascertained by experience in the special case. Therefore preferably the supports 39, 40, 43 and 44 are secured to the beam sections 20 and 22 respectively to permit limited longitudinal shifting movement.

FIGURE 3 shows a cross section along line 3—3 of the switch beam section 20 of FIGURE 1. The beam sections consist of a reinforced concrete beam. The flexible strip members, generally indicated by numerals 34 and 36 in FIGURE 1, in FIGURE 3 are indicated by numerals 46 and 48 for the upper strip members forming the running surfaces for upper side wheels of a vehicle passing the switch, and by numerals 50 and 52 for lower strip members forming the running surfaces for the lower side wheels of such a vehicle. Those strip members are located in recesses formed below the top running surface 54 of the beam section 20. Each strip member comprises a welded box shaped structure consisting of an outer strip 56 forming the upper running surface, two U-shaped spacer sections 58 and an inner strip 60. They are secured to the beam section 20 by means of the supports 39 and 43 respectively comprising a support plate 62 fixedly secured to the beam section e.g. by screws. Bolts 64 passing through angle pieces 66 welded to the box-shaped strip members hold the strip members in place. The holes in the angle pieces 66 through which the bolts 64 pass may be oblong to allow limited longitudinal shifting of the strip members with respect to the beam section. The lower strip members are of the same construction.

FIGURES 4 to 7 show in a more diagrammatic way the location of the switch beam sections, the pivotal connections between them and the flexible strip members together with their supporting points for different embodiments of the present invention. In those diagrammatic top plan views the beam sections are indicated by their center lines only and the guiding strip members are shown as a line located centrally between the strip members at both sides of the beam sections. Therefore the opposite supporting points are also shown as a common point represented in the figures by $c$. In the figures the different embodiments of the switches are shown only in branching off position. For clarity's sake the deviation angle of the switch is exaggerated. In practice this angle would be maximum of 15°.

FIGURE 4 shows a switch the tongue of which consists of a single rigid beam section 68. The angle obtained at the pivot point 70 is bridged by guiding strip members 72 which are fixedly supported at the beam section 68 as at 74, and are longitudinally slidably supported on the main beam 10 as at 76. In this case the guiding strip members 72 form a circular arc in branching off position.

For a better understanding of the following embodiments the essential requirements for the construction of switches for monobeam type railways are noted herewith:

(1) The spacing between the two main track sections between which the free end of the switch beam swings must be at least one half the width of the vehicle which passes over the switch.

(2) For economy and optimum operation a switch tongue should be as short as possible.

(3) For the reasons of running dynamics of the vehicles the radius of curvature of the guiding strip members in branching off position should be as large as possible.

(4) In branching off position of the switch tongue the course of the strip members should depart from the sides of the switch beam sections as little as possible.

(5) The various beam sections of a switch tongue consisting of more than one beam section preferably should be of equal length.

In the following embodiments these partly contradictory requirements are more or less taken into consideration according to the application of the switch.

FIGURE 5 shows a switch tongue consisting of two switch beam sections 78 and 79 pivotally connected to the main line as at 80 and linked together at 82. The guide strip members 84 are fixedly secured to the free end of the switch tongue at the supporting points 86 and are longitudinally slidably secured to the main line 10 at 88. The supporting points 90 in the middle of the beam section 78 are made longitudinally slidable.

In order to obtain a minimum deviation $x$ of the course of the guiding strip members from that of the switch beam sections in the embodiment of FIGURE 6 the strip members 92 are supported against the switch beam sections 94 and 95 by two support points 96 and 98 on the beam section 94. Numeral 100 designates the longitudinally slidable supporting points at the main line 10 and numeral 104 the fixed supports at the free end of the beam section 95. If the maximum deviations x and y of the strip members 92 from the beam sections 94 and 95 shall be equal, then the distances f of the support points 96 and 98 from the respective adjacent ends of the beam section 94 may be expressed in terms of the length S of the beam section 94 and R which is the chosen radius of the curve of the guiding strip members 92 as follows:

The application of the Pythagorean theorum to FIGURE 6 yields the following equations:

$$\left(\frac{S}{2}\right)^2 + (R-x)^2 = (R+y)^2$$

and $$\left(\frac{S}{2}-f\right)^2 + (R-x)^2 = R^2$$

With $x=y$ the first equation gives $$x = \frac{S^2}{16R}$$

From the second equation follows $$\frac{S^2}{4} - Sf + f^2 + R^2 - 2Rx + x^2 = R^2$$

$$f^2 - Sf + \frac{S^2}{8} + \left(\frac{S^2}{16R}\right)^2 = 0$$

$$f = \frac{S}{2} \pm \sqrt{\frac{S^2}{4} - \frac{S^2}{8} - \left(\frac{S^2}{16R}\right)^2} = S(\tfrac{1}{2} - \tfrac{1}{2}\sqrt{\tfrac{1}{2}-(S/8R)^2})$$

Since for switches for monobeam type railways the corrective term $(S/8R)^2$ is negligibly small, the distance $f$ can be obtained by the formula $$f = SX[\tfrac{1}{2} - \tfrac{1}{2}\sqrt{\tfrac{1}{2}}] = 0.146S$$

The switch tongue of FIGURE 7 consists of three pivotally connected beam sections 108, 110 and 112, beam section 108 of which is pivotally connected to the main line 10.

The guiding strip members 114 extend only along the actual switch tongue and end at the pivot point 116 connecting the main line 10 with the beam section 108. The guiding strip members 114 are supported at each one of the beam sections 108, 110 and 112 by two support points 118, 120; 122, 124; 126, 128.

The beam sections 108, 110 and 112 are of equal length. For a given position of the beam sections, the position and curvature of the guiding strip members 114 can be altered by a different arrangement of the support points 120, 122, 124 and 126 with respect to their distances from each other and from the pivotal connections 130 and 132. The curvature of the strip members 114 includes two parabolic branches (from the support points 118 to 120 and from the support points 126 to 128) and a circular arc (from the support points 120 to 126). In FIGURE 7 the strip members 114 have a course which as much as possible conforms to the course of the beam sections 108, 110 and 112. Thereby the maximum deviations x and y of the course of the strip members 114 from that of the beam sections are of equal size. The distances g and h of the support points 120, 126 and 122, 124 from the respective adjacent ends of the beam sections 108, 110 and 112 each respectively must have a value within the range of 0.12 to 0.22 times the length T of one of the beam sections. Suitably the support points 120, 122, 124 and 126 are secured to the beam sections for longitudinal adjustment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A switch construction for connecting a first monobeam track section selectively with second or third monobeam track sections, each of said track sections having a running surface for the load carrying wheels of a vehicle and side surfaces providing a running surface for at least one side vehicle wheel, comprising a switch tongue beam assembly pivotally connected at one end to said first track beam section to permit its opposite free end to be swung into alignment with said second or third track sections, flexible strip assemblies, means rigidly supporting said strip assemblies on the opposite sides of said switch tongue beam assembly, and additional means supporting said strip assemblies at the opposite sides of said first track beam section to form continuations of the side running surfaces on said first track beam section, said additional support means permitting limited longitudinal movement of the adjacent portions of the strip assemblies and the strip assemblies being in spaced relation to the sides of said main track beam section and said switch tongue beam assembly except at the supported points whereby during swinging movement of the switch tongue beam assembly said strip members are continuously curved along their longitudinal axes.

2. The switch construction according to claim 1 in which the strip assemblies are of hollow tubular construction.

3. The switch construction according to claim 1 wherein said switch tongue beam assembly comprises two pivotally connected beam sections together with further support means mounting said strip assemblies adjacent the ends of one of the beam sections which is pivotally connected to said first track beam section.

4. A switch construction for connecting a first monobeam track section selectively with second or third monobeam track sections, comprising first and second articulated switch beam sections, means pivotally connecting one end of said first switch beam section to one end of said first track section to permit the free end of said second switch beam section to be swung into alignment with said second and third track sections, flexible strip assemblies, means pivotally supporting said strip assemblies on the opposite sides of said second switch beam section adjacent its free end, additional means supporting said strip assemblies at the opposite side of said first switch beam section adjacent its pivotal connection to said first track section, and further support means supporting said strip assemblies adjacent the adjacent ends of said first and second switch beam sections, said additional support means and said further support means permitting limited longitudinal movement of the adjacent portions of the strip assemblies and the strip assemblies being in spaced relation to the sides of said track sections and said switch beam sections except at the supported points whereby during swinging movement of the switch beam sections said strip members are continuously curved along their longitudinal axes.

5. The switch construction according to claim 4 wherein the distance between said further support means and the adjacent ends of the associated switch beam section is from 0.13 to 0.16 times the length of the latter whereby when said switch tongue is swung to branching off position, said strip assemblies assume a parabolic form adjacent their ends and are circularly curved adjacent their midpoints.

6. Switch construction for connecting a first monobeam track section selectively with second or third monobeam track sections, comprising first, second and third articulated switch tongue sections, said first switch tongue section being pivotally connected to said first track section, flexible strip assemblies, means pivotally supporting said strip assemblies on the opposite sides of said third switch tongue section adjacent the free end thereof, second support means supporting said strip assemblies on the opposite sides of said first switch tongue section adjacent its pivotal connection to said first track section and third support means supporting said strip assemblies at opposite sides of said switch tongue sections adjacent the adjacent ends of said first and second switch tongue sections and adjacent the adjacent ends of said second and third switch tongue sections, respectively, said second and third support means permitting limited longitudinal movement of the adjacent portions of the strip assemblies and the strip assemblies being in spaced relation to the sides of the beam sections except at the supported points whereby during swinging movement of the switch tongue sections, said strip members are continuously curved along their longitudinal axes.

7. The switch construction according to claim 6 wherein said switch tongue sections are of equal length and the distance between said third support means and the adjacent ends of said switch tongue sections is from 0.12 to 0.22 times the length of said switch tongue sections.

8. A switch construction for connecting a first monobeam track section selectively with second or third monobeam track sections, each of said track sections having a running surface for the load carrying wheels of a vehicle and side surfaces providing a running surface for at least one side vehicle wheel comprising a switch tongue beam assembly pivotally connected at one end to said first track section to permit its opposite end to be selectively swung into alignment with said second or third track sections, flexible strip assemblies, means supporting said strip assemblies on the opposite sides of said switch tongue beam asembly to form continuations of the side running surfaces on said monobeam track sections, said strip assemblies being in spaced relation to the sides of said switch tongue beam assembly except at the supported points whereby during swinging movement of the switch tongue beam assembly said strip members are continuously curved along their longitudinal axes.

9. A switch construction for connecting a first track beam assembly selectively with second and third track beam assemblies, each of said track beam assemblies having a running surface for the load carrying wheels of a vehicle and having side surfaces providing running surfaces for side vehicle wheels comprising a switch beam assembly pivotally connected at one end to said first track beam assembly to permit its opposite end to be selectively swung into alignment with said second or third track beam assemblies, flexible strip assemblies, means pivotally supporting said strip assemblies on the opposite sides of the said switch beam assembly, and additional means supporting said strip assemblies at the opposite sides of certain of said beam assemblies to form continuations of the side running surfaces on said first track beam assembly, said additional support means permitting limited longitudinal movement of the adjacent portions of said strip assemblies, and the strip assemblies being in spaced relation to each of said track beam assemblies except at the supported points whereby during swinging movement of said switch beam assembly said strip members are continuously curved along their longitudinal axes.

10. A switch construction for connecting a first monobeam track section selectively with second or third monobeam track sections comprising a plurality of articulated switch beam sections, means pivotally connecting one end of one of said switch beam sections to one end of said first track section to permit the free end of another switch beam section to be selectively swung into alignment with said second and third track sections, flexible strip assemblies, means pivotally supporting said strip assemblies on the opposite sides of one of said switch beam sections adjacent its free end, additional means supporting said strip assemblies at other points along their length, said additional support means permitting limited longitudinal shifting movement of the adjacent portions of said strip assemblies, and the strip assemblies being in spaced relation to the sides of said track sections and said switch beam sections except at the supported points whereby during swinging movement of the switch beam sections said strip members are continuously curved along their longitudinal axes.

References Cited in the file of this patent

UNITED STATES PATENTS

| | | |
|---|---|---|
| 834,483 | McIlvaine | Oct. 30, 1906 |
| 1,602,378 | Harris | Oct. 5, 1926 |
| 2,434,523 | Sheets | Jan. 13, 1948 |
| 2,792,791 | Kreissig | May 21, 1957 |